United States Patent [19]

Okamoto et al.

[11] Patent Number: 5,444,746
[45] Date of Patent: Aug. 22, 1995

[54] CONTAMINATION INSPECTING DEVICE FOR PORTABLE ARTICLES

[75] Inventors: Katsuya Okamoto, Osaka; Tomoharu Harada, Yokohama; Takashi Yamamoto, Yokohama; Singi Nishida, Yokohama, all of Japan

[73] Assignees: Kansai Electric Power Co., Ltd., Osaka; JGC Corporation, Tokyo, both of Japan

[21] Appl. No.: 45,879

[22] Filed: Apr. 14, 1993

Related U.S. Application Data

[63] Continuation-in-part of Ser. No. 826,189, Jan. 23, 1992, abandoned, which is a continuation of Ser. No. 658,906, Feb. 22, 1991, abandoned.

[51] Int. Cl.⁶ ............................................. G21C 17/00
[52] U.S. Cl. ..................................... 376/245; 376/249; 250/359.1; 250/360.1; 901/16; 901/17; 901/44
[58] Field of Search .............. 376/245, 159, 257, 260, 376/249, 254, 258; 250/358.1, 359.1, 360.1, 336.1, 363.01, 361 R; 901/16, 17, 18, 29, 44

[56] References Cited

U.S. PATENT DOCUMENTS

| | | | |
|---|---|---|---|
| 3,555,239 | 1/1971 | Kerth | 219/125 |
| 4,149,932 | 4/1979 | Jacobs et al. | 176/19 R |
| 4,291,227 | 9/1981 | Caldwell et al. | 250/328 |
| 4,649,650 | 3/1987 | Fink et al. | 33/143 L |
| 4,781,517 | 11/1988 | Pearce et al. | 414/590 |
| 4,787,715 | 11/1988 | Ahmed et al. | 356/244 |
| 4,866,277 | 9/1989 | Johnson et al. | 250/385.1 |
| 4,977,512 | 12/1990 | Nakagawa | 364/474.37 |
| 5,135,706 | 8/1992 | Costes et al. | 376/245 |

FOREIGN PATENT DOCUMENTS

| | | | |
|---|---|---|---|
| 210974 | 2/1987 | European Pat. Off. | 901/16 |
| 232999 | 8/1987 | European Pat. Off. | 901/16 |
| 320498 | 6/1989 | European Pat. Off. | 901/16 |
| 57-93238 | 6/1982 | Japan | 376/245 |
| 63-234199 | 9/1988 | Japan | 376/245 |

*Primary Examiner*—Donald P. Walsh
*Assistant Examiner*—Chrisman D. Carroll
*Attorney, Agent, or Firm*—Nikaido, Marmelstein, Murray & Oram

[57] ABSTRACT

The invention provides an improved contamination inspecting device which can carry out continuous, automatic inspection of portable articles both large and small regardless of their shape. The device incorporates a conveying means for carrying the articles through the inspection position wherein the speed of the conveying means is varied based on the background radioactivity detected by the plane scintillator, a plane scintillator for detecting radiation from both the background environment and the articles to be inspected, a five-axes gate-type underriding mechanism which incorporates a robot arm so as to enable the plane scintillator to travel along the surfaces of each article, and control means for controlling the speed of the conveying means based on the background radioactivity detected by the plane scintillator and for controlling the five-axis robot based on the shape of the articles to be inspected.

12 Claims, 6 Drawing Sheets

CONTAMINATION INSPECTING DEVICE FOR PORTABLE ARTICLES

This application is a continuation-in-part of application Ser. No. 07/826,189 filed Jan. 23, 1991, now abandoned, which was a continuation of application Ser. No. 07/658,906 filed Feb. 22, 1991, now abandoned.

BACKGROUND OF THE INVENTION

1. Field of the Invention

The present invention relates to an automatic contamination inspecting device for checking radioactive contamination of articles which are carried away from a nuclear power installation such as a power plant.

2. State of the Art

When articles used in a radiation control area of a nuclear power plant are carried away therefrom, it is necessary to inspect whether radioactive contamination of the respective surfaces of the articles is within permissible limits.

This contamination inspection has conventionally been done manually using a scintillator manipulated by hand to survey all the surfaces of an article one by one. This process was found to be of course troublesome and inefficient.

For the purpose of reducing labor, a contamination inspecting device termed "a monitor for checking small articles to be carried away" was manufactured and has been used for inspecting the contamination of the articles. In this device, the articles to be inspected are transferred by hand to an inspection position and measurement as to the strength of the radioactivity of the articles is conducted with a gas flow counter and a plastic scintillator. Only documents or small instruments can be inspected by this conventional device, and large instruments or measuring instruments cannot be inspected.

Large or long articles such as scaffolding equipment and materials including scaffolding boards and pipes are carried to the inspection position manually and tested for radioactive contamination with a monitor. This monitor, however, cannot be applied to small articles.

SUMMARY OF THE INVENTION

The object of the invention is to provide an improved contamination inspecting device which can carry out continuous, automatic inspection of portable articles both large and small regardless of their shape.

The above object is attained by a contamination inspecting device of the present invention for portable articles carried away from a radiation control area in a nuclear power installation in order to automatically detect radioactive contamination of the respective surfaces of the articles. The above object is further accomplished by continual disposition of plural articles with a conveyor and surveying the surfaces thereof with a scintillator manipulated by a five-axis gate-type underriding mechanism. The device comprises:

a) a conveying means for carrying the articles through the inspection position wherein the speed of the conveying means is varied based on the background radioactivity detected by the plane scintillator, b) a plane scintillator for detecting radiation from both the background environment and the articles to be inspected, and a monitor means for displaying the detected results after surveying, c) a five-axes gate-type underriding copy mechanism which incorporates a robot arm so as to enable the plane scintillator to travel along the surfaces of each article, and d) control means for controlling the speed of the conveying means based on the background radioactivity detected by the plane scintillator and for controlling the five-axis robot based on the shape of the articles to be inspected as determined by the underriding mechanism.

The automatic operation of the invention achieves a high level of reliability by the automatic determination of the variations in background radioactivity levels with the scintillator and through the automatic adjustment of the transferring speed of the conveyor depending on the measured level of the background radioactivity. The small differences between the background radiation and surfaces of articles being inspected, even if contaminated, have been found to affect the reliability of the inspection operation.

Among the main features of the invention, (1) the five-axis robot recognizes the shapes of the articles to be inspected and runs in accordance with the underriding mechanism; (2) the scintillator determines the background radioactivity level and the surface contamination of the articles being inspected; and (3) the conveyor conveys the articles at a speed which may be varied based on the output of the scintillator.

DESCRIPTION OF THE PREFERRED EMBODIMENT

Figure 1:
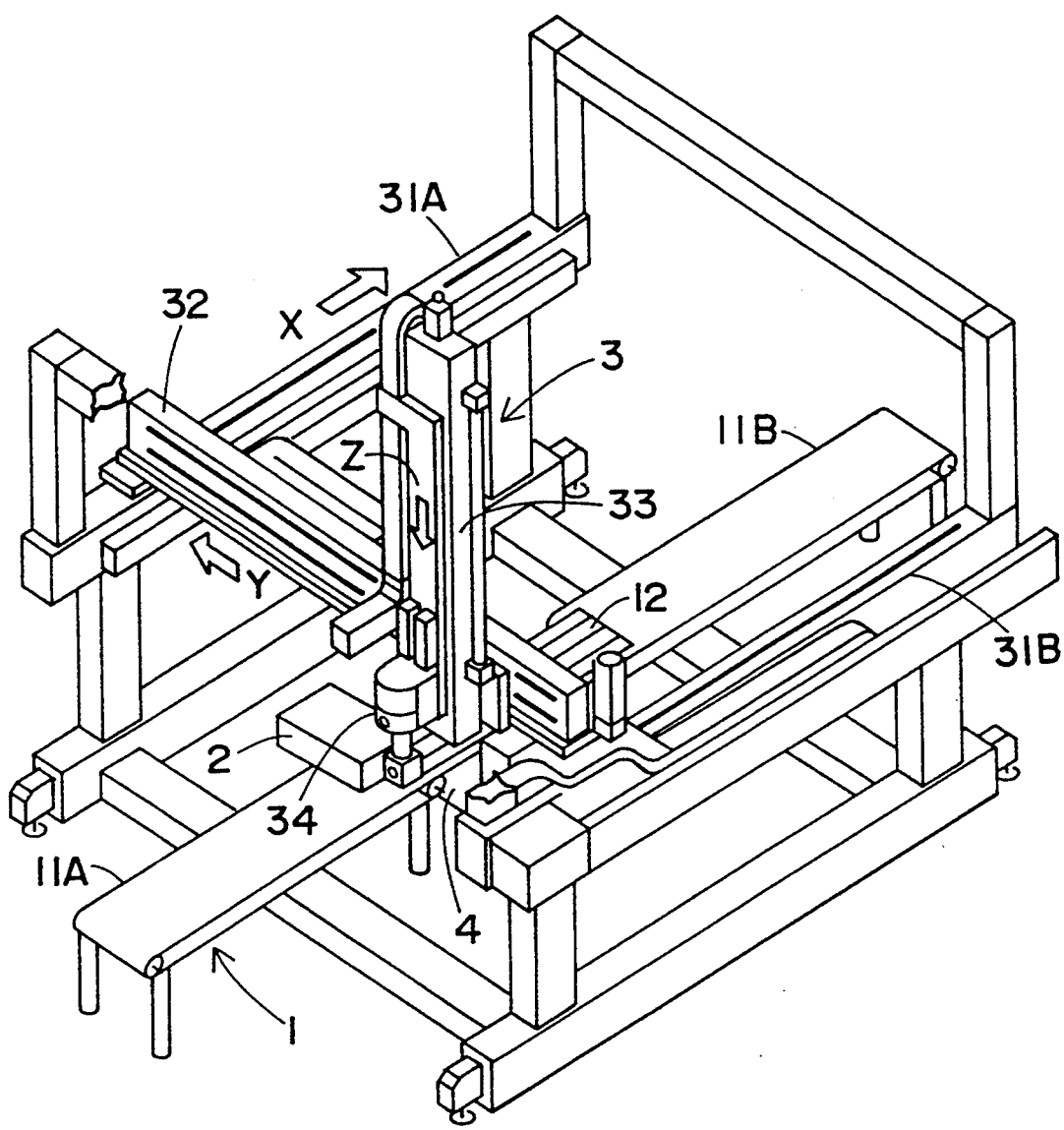
FIG. 1 is a perspective view illustrating the entire construction of the contamination inspecting device for portable articles in accordance with the present invention.

The construction of a preferred embodiment of the present invention is illustrated in FIG. 1. In order to readily inspect the respective bottoms and sides of the articles, a plane scintillator 2 and/or a sectionally U-shaped scintillator 4 are used.

Figure 4:
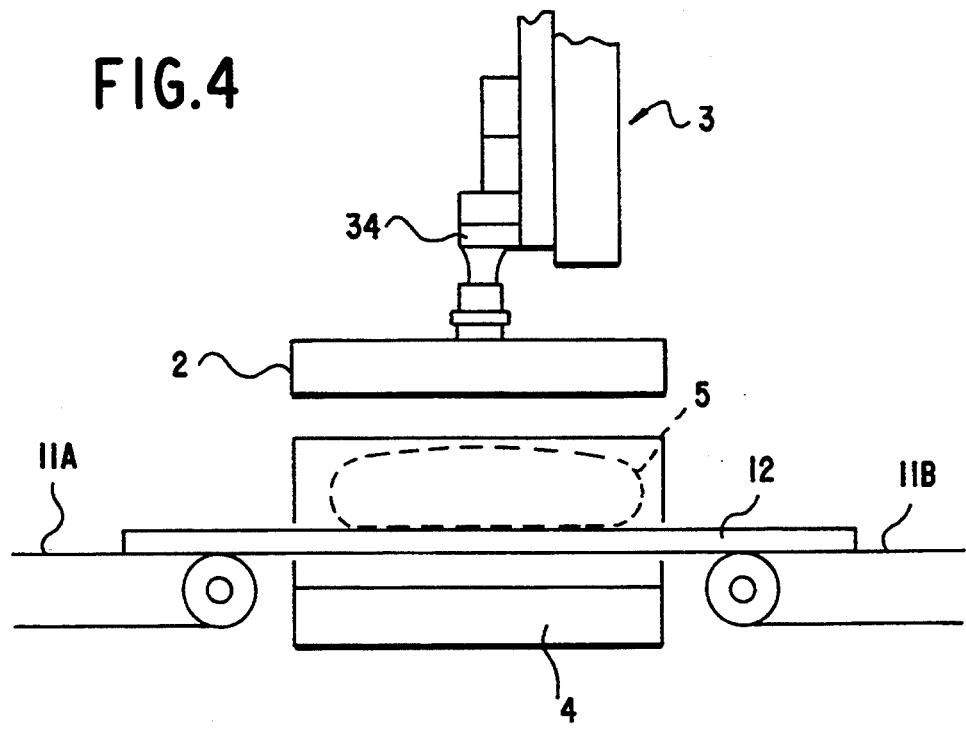

An inspection conveyor 1 is used to convey the article to be inspected along the U-shaped scintillator 4 and/or the plane scintillator 2. One type of inspection conveyor 1 incorporates a belt conveyor. For example, as shown in FIG. 4, a combination of two belt conveyors 11A and 11B and a tray 12 on which are placed the articles 5 to be inspected can be employed when using the sectionally U-shaped scintillator 4. Accordingly, the tray 12 should be made of a material which does not shield radiation, such as plastics, and should be of the construction such as a metal lattice or mesh.

Figure 3:
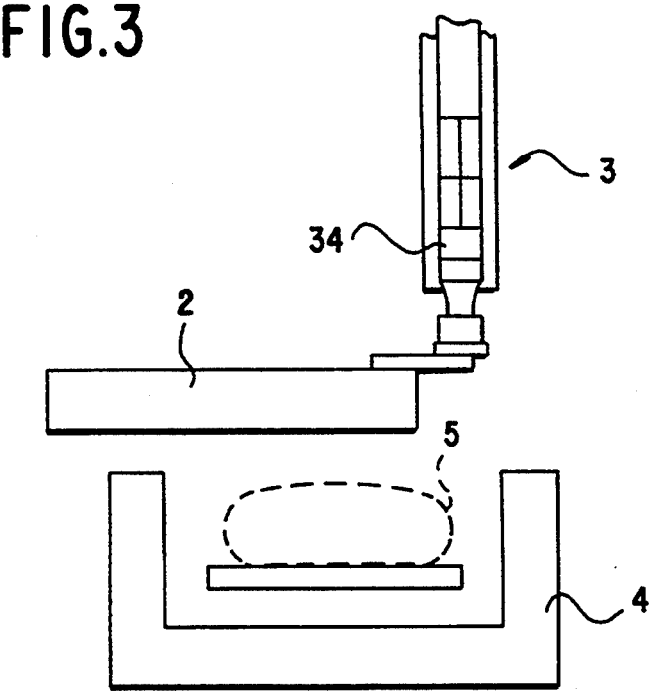
FIG. 3 and FIG. 4 are transverse sectional and longitudinal sectional views, respectively, taken along a perpendicular direction of the device located at an inspection position according to a preferred embodiment of the present invention.

As shown in FIGS. 3 and 4, the U-shaped scintillator is preferably provided detachably under the inspection position of the articles.

Figure 2:
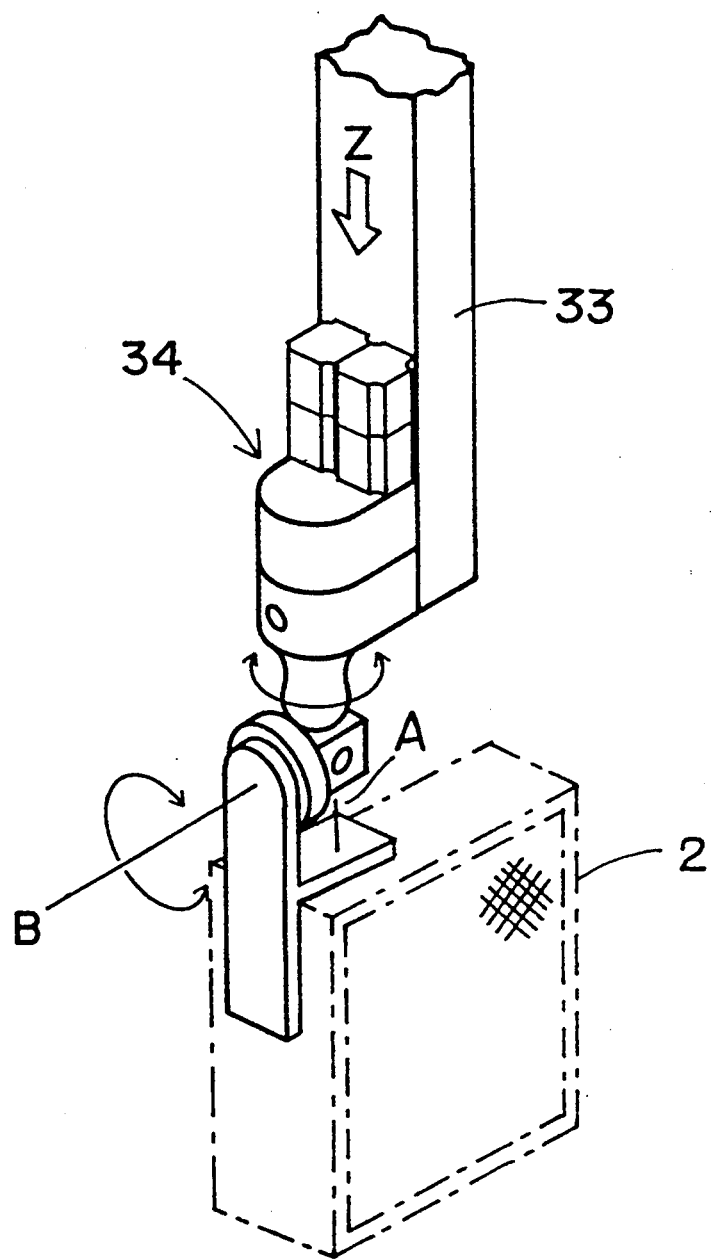
FIG. 2 is a perspective view showing a five-axes gate-type underriding copy mechanism in accordance with the present invention.

The five-axes gate type underriding mechanism 3 is illustrated in further detail in FIG. 2. The mechanism 3 has five axes; three axes out of the five axes are the X-axis, Y-axis and Z-axis. The X-axis is defined with respect to two rails 31A and 31B parallel with the direction of travel of the inspection conveyor 1. The Y-axis is designated by a rail 32 which extends across the rails 31A and 31B and is slidable toward the X-axis direction. The Z-axis is designated by a vertical rail 33 which travels along the rail 32.

The head 34 of the robot arm can travel along the vertical rail 33 toward the Z axis. This head 34 is not only rotatable at an angle of more than 360° (for example, 380°) around the A-axis, namely a vertical revolving axis, but also rotatable 360° around the B-axis, namely a horizontal revolving axis. Overall, the plane scintillator 2 is designed so as to approach three-dimensionally from all directions the article to be inspected, following the surface configuration of the article. Accordingly, the scintillator 2 can detect all the radiation from every direction and from the background environment.

Figure 5:
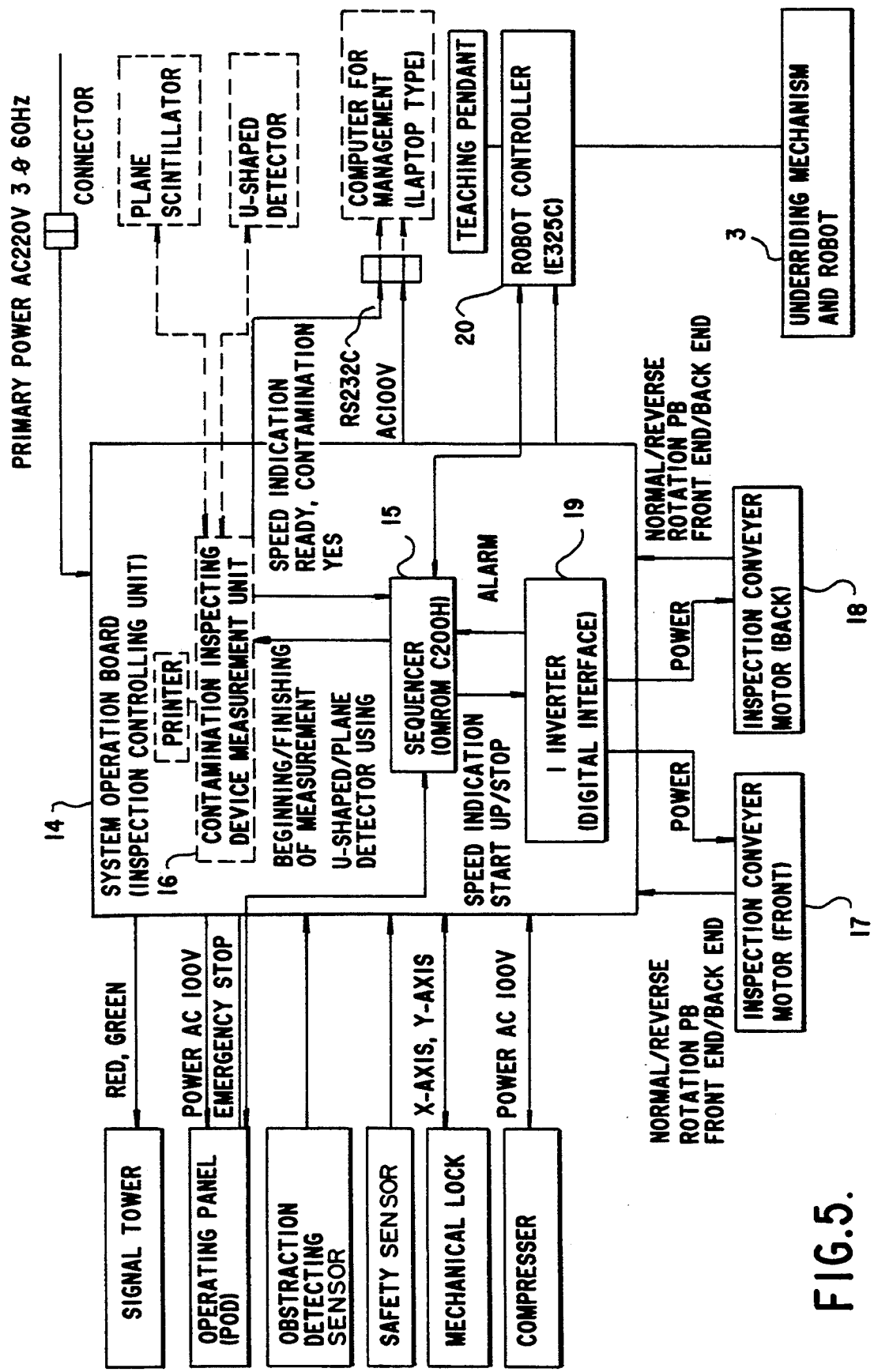
FIG. 5 is a block diagram showing the connection of the control system to the various elements of the invention.

As shown in FIG. 5, an inspection control unit 14 is incorporated between the plane scintillator 2 and U-shaped scintillator 4, and the inspection conveyor 1 wherein the speed of the belt conveyor is varied based on the detected background radiation from the plane scintillator 2 and U-shaped scintillator 4. Specifically, in operation, the plane scintillator 2 and U-shaped scintillator 4 are initially controlled by the control unit 14 so as to obtain a background radiation measurement. The measured background radiation level is then used by the measurement unit 16 of the control unit 14 in order to compute the speed of the inspection conveyor 1 for conveying the article to be inspected. Based on the measured background radiation level, the measurement unit 16 transmits a signal to a sequencer 15. The sequencer 15 then generates inverter output signals (i.e., current control signals) through an inverter 19 which are inputted into the driving motors 17, 18 incorporated into the inspection conveyor 1. The background radiation level along with the radiation level of the article being inspected are then continuously computed by the measurement unit 16 in controlling the speed of the inspection conveyor 1, in order to perform surface inspection continuously without interrupting the movement of the article on the inspection conveyor 1.

The control means 14 is also connected to the underriding mechanism 3 of the five-axis robot through the robot controller 20 so as to control the operation of the underriding mechanism 3 with the plane scintillator 2 and/or the U-shaped scintillator 4 based on the shape of the articles to be inspected. For example, when the articles to be inspected are small in size or flat, they are placed in the tray 2 and carried to the inspection position with the belt conveyor 11A. The U-shaped scintillator as illustrated in FIGS. 3 and 4 is then utilized primarily to inspect the article, but can be operated in conjunction with the plane scintillator in order to inspect all six planes of the article.

Figure 6:
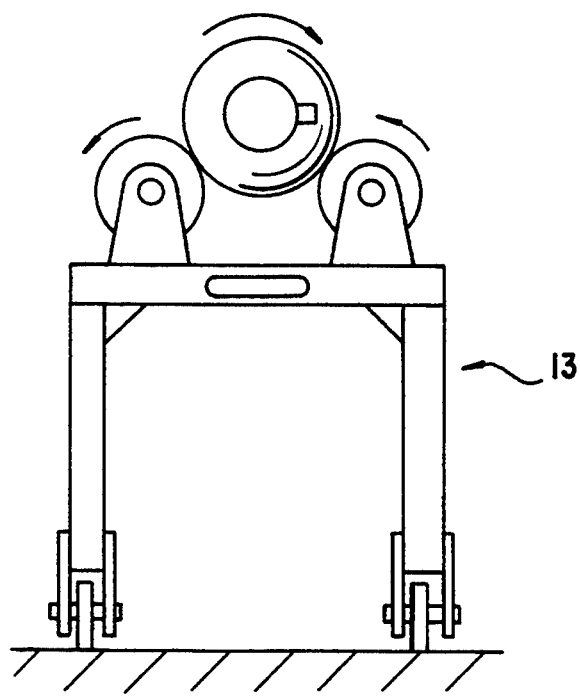
FIG. 6 and FIG. 7 are views illustrating a roller inspection conveyor for inspecting a cylindrical body such as a bomb.
Figure 7:
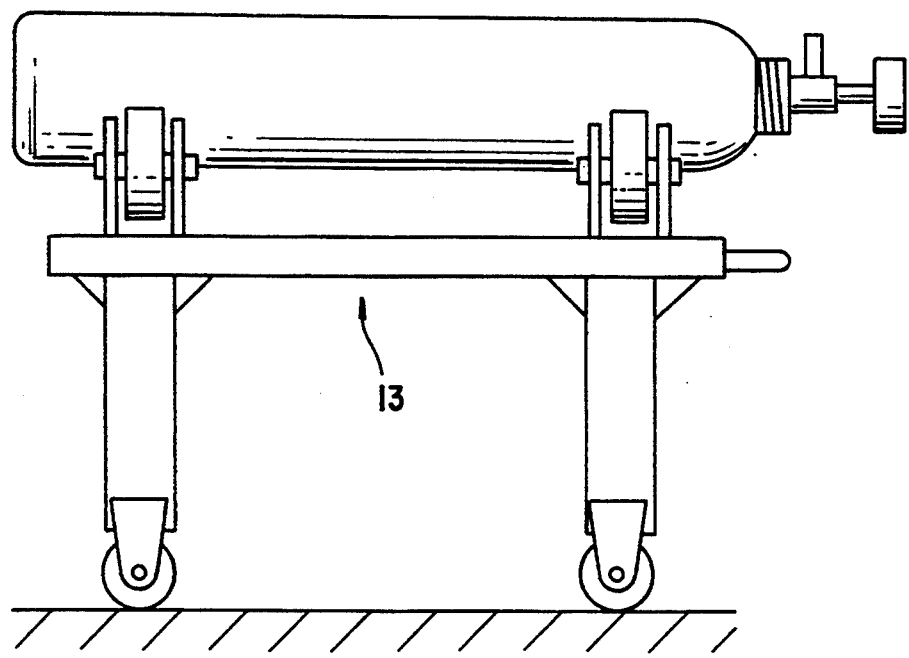

In cases where the articles are medium sized, they can be inspected in a similar way as with small articles. With articles that are large in size, similar procedures can also be performed. For example, box-shaped articles or articles with profiles up to 600 mm, only the plane scintillator is controlled in order to inspect all six planes of the article. However, with some specifically-shaped articles, it is preferable to use a movable inspection stand such as that illustrated in FIGS. 6 and 7 with the articles placed thereon instead of the belt conveyor. For example, when the articles are cylindrical such as a pipe or bomb, moving the scintillator along the X-axis direction is sufficient to check the cylindrical articles while rotating it during the inspection. A conveyor platform 13 incorporating rollers can be used to rotate the article as the platform 13 itself moves forward, while the plane scintillator 2 travels around the article. By operating the U-shaped scintillator and the plane scintillator in conjunction with one another and the inspection conveyor 1, all six planes of the article can effectively be observed.

Figure 8:
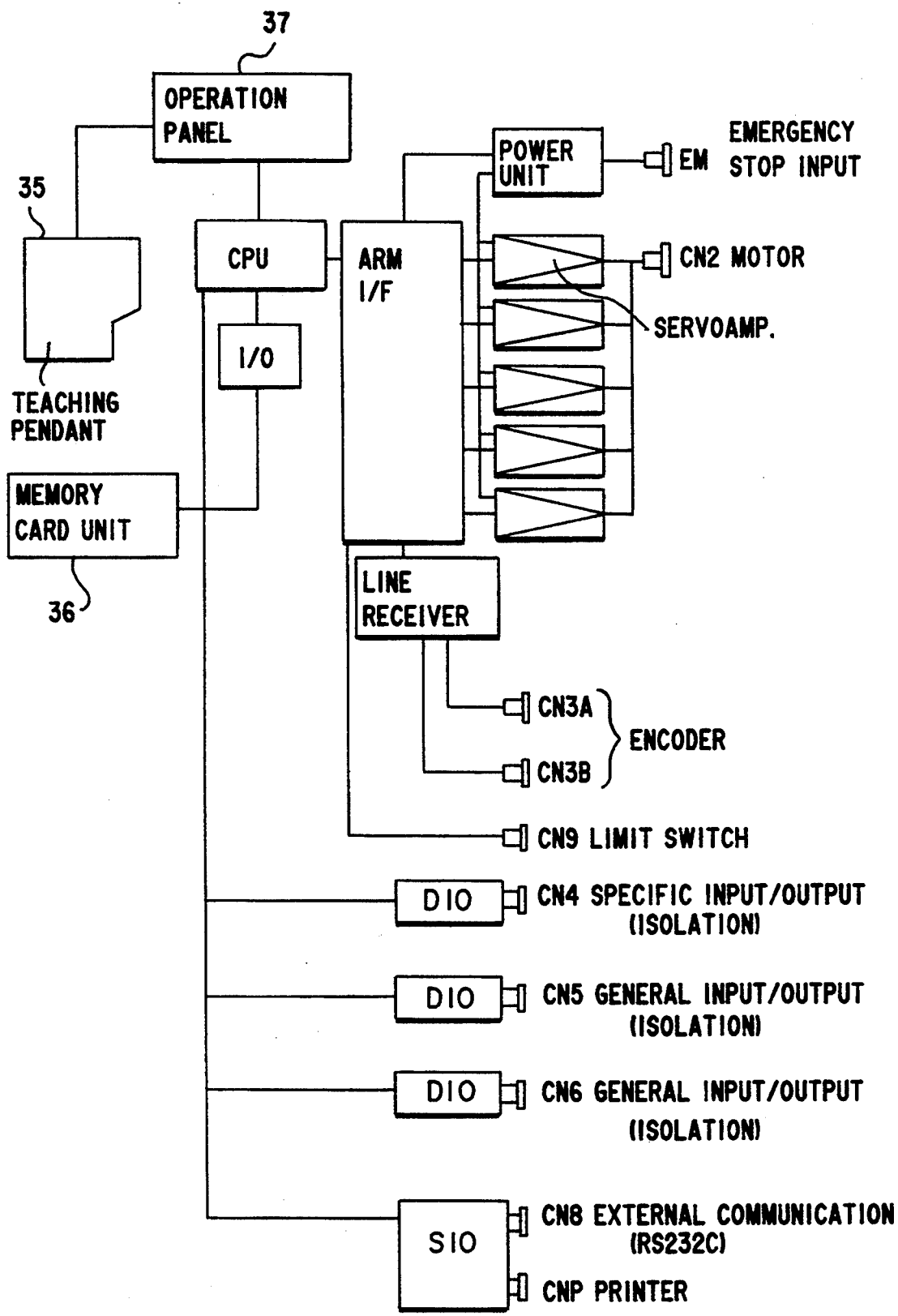
FIG. 8 is a block diagram illustrating the structure of robot arm incorporated in the five-axes underriding mechanism of the invention.

As illustrated in FIG. 8, the five-axes robot can be programmed through a teaching pendant 35 or a memory card unit 36. The operating procedure for the robot can thus be input in advance and indicated in the display, whereby an operator can readily follow that procedure by interactive instructions on an operation panel 37. Thus, the detection of the contamination can be carried out automatically under computer control.

Installation of the present inspecting device at the outlet of a radiation control area can effectively detect the surface contamination of a variety of portable articles in a short time, regardless of the configuration and dimensions of the articles. Especially when using the device which employs the plane scintillator in a large area, it is possible to automatically measure the background radiation before inspection, in order to inspect articles at the most effective periods.

We claim:

1. A contamination inspecting device for portable articles from a radiation control area in a nuclear power installation for the purpose of automatically detecting radioactive contamination on the surfaces of the article, the device comprising:

a means for conveying articles to be inspected through an inspection position;

a scintillator means for detecting radiation having a monitor means for displaying detected results after surveying the articles to be inspected, said scintillator means further being for detecting background radiation of an area surrounding the inspection position prior to inspecting the articles to be inspected;

a five-axes gate-type underriding mechanism having a head which can travel and revolve in five axes so as to enable said scintillator means to three-dimensionally survey plural surfaces of the articles to be inspected, said scintillator means being operatively mounted on the head, said underriding mechanism further including an X-axis rail, a Y-axis rail, a Z-axis rail, vertical revolving means for enabling the head to revolve around a vertical revolving axis, and a horizontal revolving means for enabling the head to revolve around a horizontal revolving axis; and control means operatively connected to said conveying means, said scintillator means and said underriding mechanism, for controlling operation of said conveying means and said underriding mechanism during surveying of the articles to be inspected based on the background radiation detected.

2. A contamination inspecting device for portable articles according to claim 1, further comprising:
a plane or sectionally U-shaped scintillator operatively positioned under said conveying means at the inspection position.

3. A contamination inspecting device for portable articles according to claim 1, wherein the conveying means includes a pair of belt conveyers positioned in series with each other, and a tray for holding the articles to be inspected, the tray being positioned so as to be conveyed along and between the pair of belt conveyors.

4. A contamination inspecting device for portable articles according to claim 1, wherein said conveying means includes a conveyor platform which has a plurality of rollers mounted thereon for rotating a cylindrical body to be inspected.

5. A contamination inspecting device for portable articles according to claim 1, wherein said control means is further for controlling a conveying speed of said conveying means and movement of the head of said underriding mechanism during surveying of the articles to be inspected based on the background radiation detected.

6. An automatic radiation inspection system for inspecting portable articles from a radiation control area in a nuclear power installation, the device comprising:
a means for conveying articles to be inspected through an inspection station;
a plane scintillator means for detecting radiation on articles to be inspected and for detecting background radiation of an area surrounding the inspection position prior to inspecting the articles to be inspected;
a stationary scintillator means for detecting radiation on articles to be inspected and for detecting background radiation of an area surrounding the inspection position prior to inspecting the articles to be inspected, said stationary scintillator means being fixedly positioned at the inspection station so as to have the articles to be inspected pass therethrough on said conveyor means;
a five-axes gate-type underriding mechanism having a head which can travel and revolve in five axes so as to enable said plane scintillator means to three-dimensionally survey plural surfaces of the articles to be inspected, said plane scintillator means being operatively mounted on the head, said underriding mechanism further including an X-axis rail, a Y-axis rail, a Z-axis rail, vertical revolving means for enabling the head to revolve around a vertical revolving axis, and a horizontal revolving means for enabling the head to revolve around a horizontal revolving axis;
control means operatively connected to said conveying means, said plane scintillator, said stationary scintillator and said underriding mechanism, for controlling operation of said conveying means and said underriding mechanism during surveying of the articles to be inspected based on the background radiation detected; and
a monitor means for displaying detected radiation results after surveying the articles to be inspected.

7. An automatic radiation inspection system for portable articles according to claim 6, wherein said stationary scintillator is formed as a sectionally U-shaped scintillator operatively positioned under said conveying means at the inspection station.

8. An automatic radiation inspection system for portable articles according to claim 6, wherein said conveying means includes a pair of belt conveyers positioned in series with each other, and a tray for holding the articles to be inspected, the tray being positioned so as to be conveyed along and between the pair of belt conveyors.

9. An automatic radiation inspection system for portable articles according to claim 6, wherein said conveying means includes a conveyor platform which has a plurality of rollers mounted thereon for rotating a cylindrical body to be inspected.

10. A contamination inspecting device for portable articles according to claim 6, wherein said control means is further for controlling a conveying speed of said conveying means and movement of the head of said underriding mechanism during surveying of the articles to be inspected based on the background radiation detected.

11. A robotic radiation inspection system for inspecting portable articles from a radiation control area in a nuclear power installation, the device comprising:
a means for conveying articles to be inspected through an inspection station;
a plane scintillator means for detecting radiation on articles to be inspected and for detecting background radiation of an area surrounding the inspection position prior to inspecting the articles to be inspected;
a stationary scintillator means for detecting radiation on articles to be inspected and for detecting background radiation of an area surrounding the inspection position prior to inspecting the articles to be inspected, said stationary scintillator means being fixedly positioned at the inspection station so as to have the articles to be inspected pass therethrough on said conveyor means;
a five-axes robot arm system having a head which can travel and revolve in five axes so as to enable said plane scintillator means to three-dimensionally survey plural surfaces of the articles to be inspected, said plane scintillator means being operatively mounted on the head, said robot arm system further including vertical revolving means for enabling the head to revolve around a vertical revolving axis and a horizontal revolving means for enabling the head to revolve around a horizontal revolving axis; and
control means operatively connected to said conveying means, said plane scintillator, said stationary scintillator and said robot arm system, for controlling operation of said conveying means and said robot arm system during surveying of the articles to be inspected based on the background radiation detected.

12. A contamination inspecting device for portable articles according to claim 11, wherein said control means is further for controlling a conveying speed of said conveying means and movement of the head of said robot arm system during surveying of the articles to be inspected based on the background radiation detected.

* * * * *